United States Patent [19]

Chorkey et al.

[11] Patent Number: 4,834,337

[45] Date of Patent: May 30, 1989

[54] SOLENOID OPERATED VALVE WITH SOLENOID WATTAGE ADJUSTMENT MEANS

[75] Inventors: William J. Chorkey, 34300 Lyncroft, Farmington, Mich. 48024; Harold L. Woodruff, Walled Lake, Mich.

[73] Assignee: William J. Chorkey, Farmington, Mich.

[21] Appl. No.: 176,869

[22] Filed: Apr. 4, 1988

[51] Int. Cl.$^4$ .............................................. F16K 31/06
[52] U.S. Cl. ................................. 251/129.18; 137/556; 251/360
[58] Field of Search ..................... 251/129.18, 360; 137/556

[56] References Cited

U.S. PATENT DOCUMENTS

| | | | |
|---|---|---|---|
| 2,820,604 | 1/1958 | Ray | 251/129.18 X |
| 4,640,391 | 2/1987 | Maehara et al. | 251/129.18 X |
| 4,732,362 | 3/1988 | Morioka et al. | 251/129.18 X |

FOREIGN PATENT DOCUMENTS 1250223  9/1967  Fed. Rep. of Germany ........................ 251/129.18

Primary Examiner—Arnold Rosenthal
Attorney, Agent, or Firm—Gifford, Groh, Sheridan, Sprinkle and Dolgorukov

[57] ABSTRACT

A solenoid operated poppet valve having an armature carrying a poppet valve seal which seats on a poppet valve seat on a movable poppet valve seat member, and the poppet valve seat member is axially adjustable for adjusting the stroke of the solenoid armature to adjust the solenoid wattage required for moving the armature through its operating stroke.

16 Claims, 4 Drawing Sheets

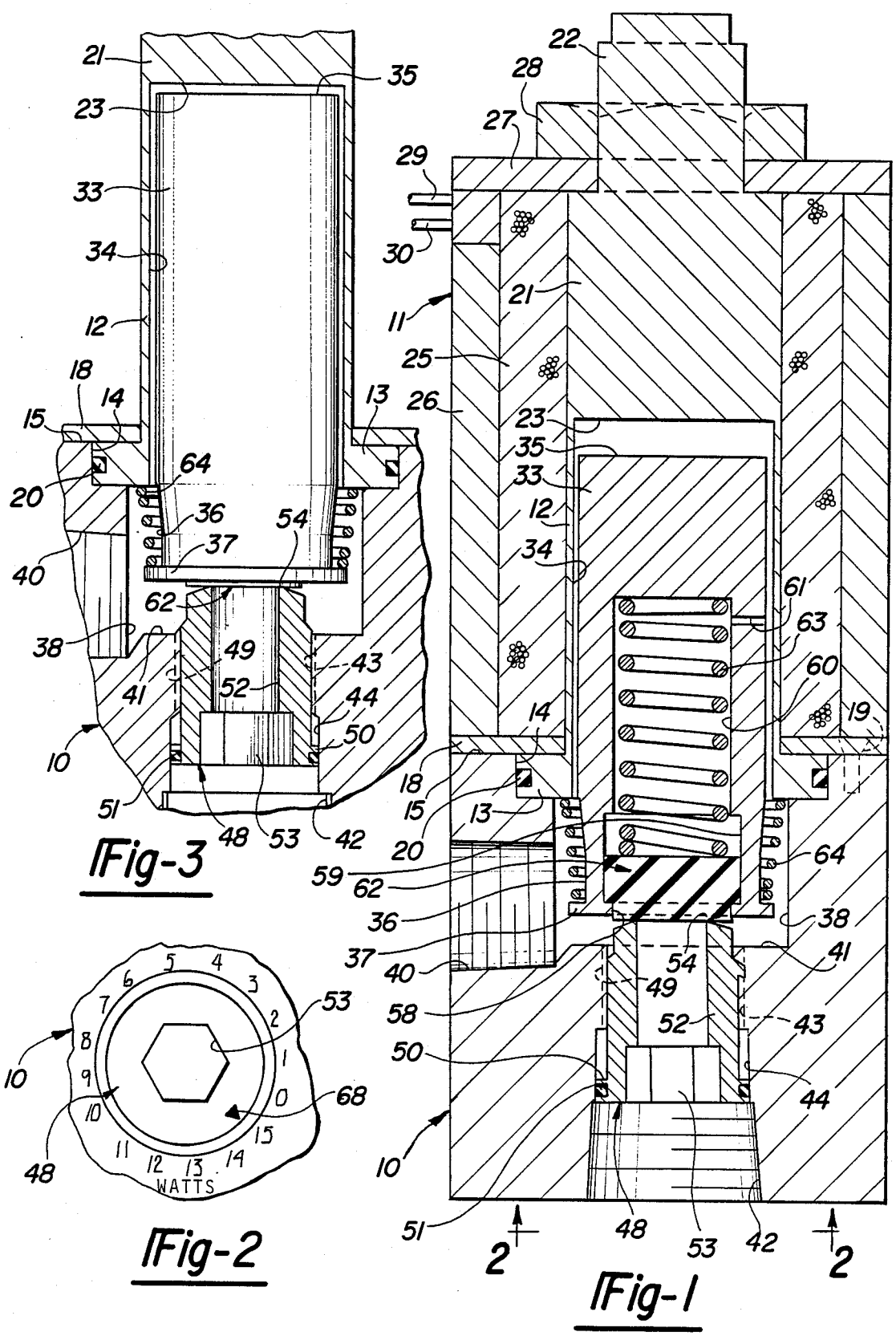

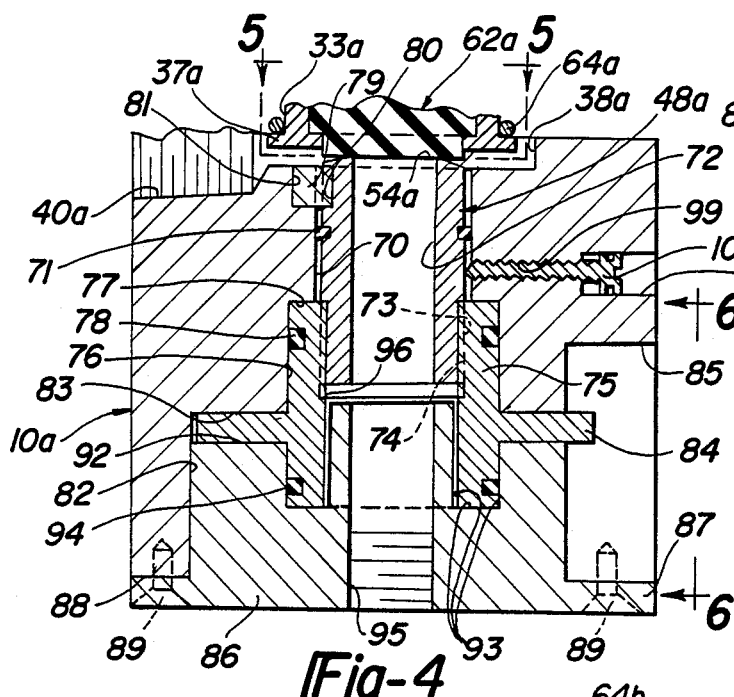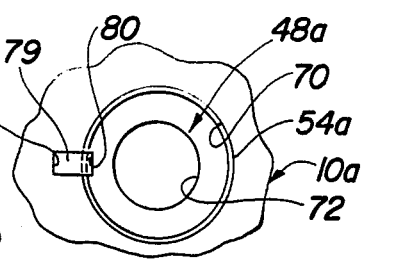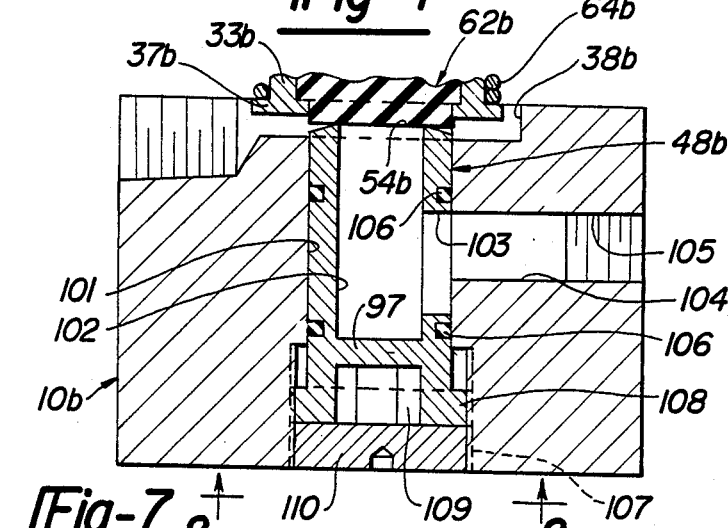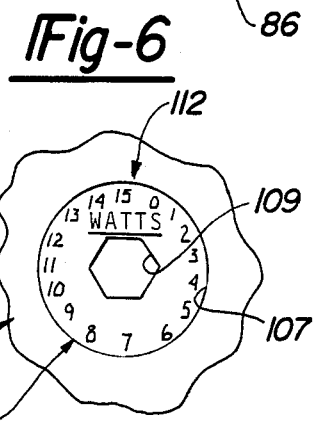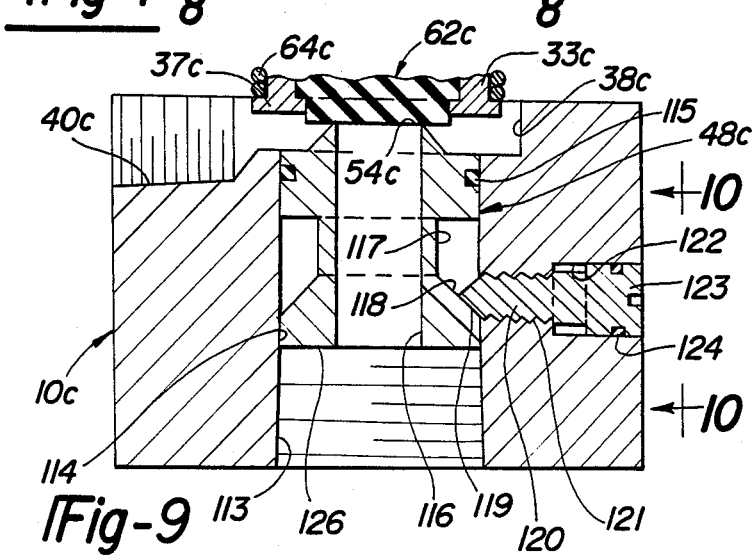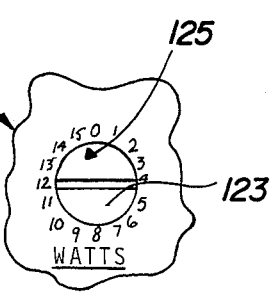

SOLENOID OPERATED VALVE WITH SOLENOID WATTAGE ADJUSTMENT MEANS

BACKGROUND OF THE INVENTION

1. Technical Field

The field of art to which this invention pertains may be generally located in the class of devices relating to valves. Class 251, Valves and Valve Actuation, and Class 335, Subclass 258, Electricity, Magnetically Operated Switches, Magnets and Electromagnets, United States Patent Office Classifications, appear to be the applicable general areas of art to which the subject matter similar to this invention have been classified in the past.

2. Background Information

In a solenoid operated valve, the length of the stroke of the solenoid plunger movement determines the amount of wattage that is required to move the plunger. The greater the stroke length of a solenoid plunger, the greater is the wattage required for moving the same. Likewise, the shorter the stroke movement of a solenoid plunger, the less wattage is required to move the same.

The prior art well-known "Skinner" type of poppet valve, as employed in the valve disclosed in U.S. Pat. No. 4,598,736, requires a distributor of such type valves to keep in stock a plurality of many type replacement parts for each size valve orifice, armature stroke, and wattage coil, to cover the requirements of customers for different wattages, different flow rates and pressures.

Electrical solenoids having means to adjust the stroke of a solenoid armature are well-known, as shown in prior U.S. Pat. Nos. 2,444,118, 3,091,725 and 3,249,823. However, the solenoids shown in the aforementioned three prior art patents do not teach a solenoid operated valve with solenoid wattage adjustment means, including an adjustable poppet valve seat member.

SUMMARY OF THE INVENTION

In accordance with the invention, a solenoid operated valve is provided with means for adjusting the working stroke of the solenoid armature, to adjust the wattage required to move the solenoid armature through a working stroke. The solenoid operated valve includes a poppet valve seal carried by the solenoid armature. A poppet valve seat is carried on a poppet valve seat member which is adjustably mounted in the body of the valve. The armature is maintained in an initial position when the solenoid is de-energized, with the poppet valve seat in closing engagement with the poppet valve seat by an armature return spring. The armature is retracted through a working stroke when the solenoid is energized, to move the poppet valve seal off of the poppet valve seat to allow flow therethrough. The poppet valve seat member is adjustable axially of the armature working stroke, to adjust the length of the armature working stroke and to correspondingly adjust the solenoid wattage required to move the armature through its working stroke when the solenoid is energized. The invention may be incorporated in a multi-ported valve, such as a two-way valve, a three-way valve or a four-way valve.

Heretofore, it was necessary to provide many different length armatures, solenoid coils of different wattages, valve bodies, valve elements, and the like, to supply the market with a plurality of valves with different wattage requirements. The present invention overcomes this problem by providing a valve wherein a poppet valve seat member may be quickly and easily adjusted to change the working stroke of a solenoid valve armature to accommodate a different size wattage solenoid coil to correspond to the armature adjusted working stroke. Accordingly, a supplier of valves embodying the present invention can supply the needs of the market for solenoid valves operating under different wattages with a smaller inventory of valve parts than heretofore possible.

BRIEF DESCRIPTION OF THE DRAWINGS

FIG. 1 is a longitudinal section view of a two-way solenoid operated valve provided with a solenoid wattage adjustment means, and showing said adjustment means in a position to allow the armature of the solenoid to move through a whole stroke or axial movement when the solenoid is energized.

FIG. 2 is a fragmentary, end elevation view of the valve structure shown in FIG. 1, taken along the line 2—2 thereof, looking in the direction of the arrows, and showing adjustment indicia on the valve body and on an adjustable poppet valve seat member.

FIG. 3 is a fragmentary, longitudinal section view of the two-way valve structure shown in FIG. 1, with parts removed, and showing the adjustable poppet valve seat member moved to a position to permit the solenoid armature to move through a stroke which is one-third of the length of the stroke of the armature shown in FIG. 1.

FIG. 4 is a fragmentary, longitudinal section view of a second embodiment of a solenoid wattage adjustment means adapted for use with the valve illustrated in FIG. 1.

FIG. 5 is a fragmentary, horizontal view of the structure illustrated in FIG. 4, taken along the line 5—5, and looking in the direction of the arrows.

FIG. 6 is a fragmentary, right side view of the valve structure shown in FIG. 4, along the line 6—6, and looking in the direction of the arrows.

FIG. 7 is a fragmentary, longitudinal section view of a third embodiment of a solenoid wattage adjustment means adapted for use with the valve illustrated in FIG. 1.

FIG. 8 is a fragmentary, bottom view of the valve structure shown in FIG. 7, taken along the line 8—8 thereof, looking in the direction of the arrows, and with the locking disc removed.

FIG. 9 is a fragmentary, longitudinal section view of a fourth embodiment of a solenoid wattage adjustment means adapted for use with the valve illustrated in FIG. 1.

FIG. 10 is a fragmentary, right side view of the valve structure shown in FIG. 9, taken along the line 10—10 thereof, and looking in the direction of the arrows.

DESCRIPTIONS OF THE PREFERRED EMBODIMENT

Figure 11:
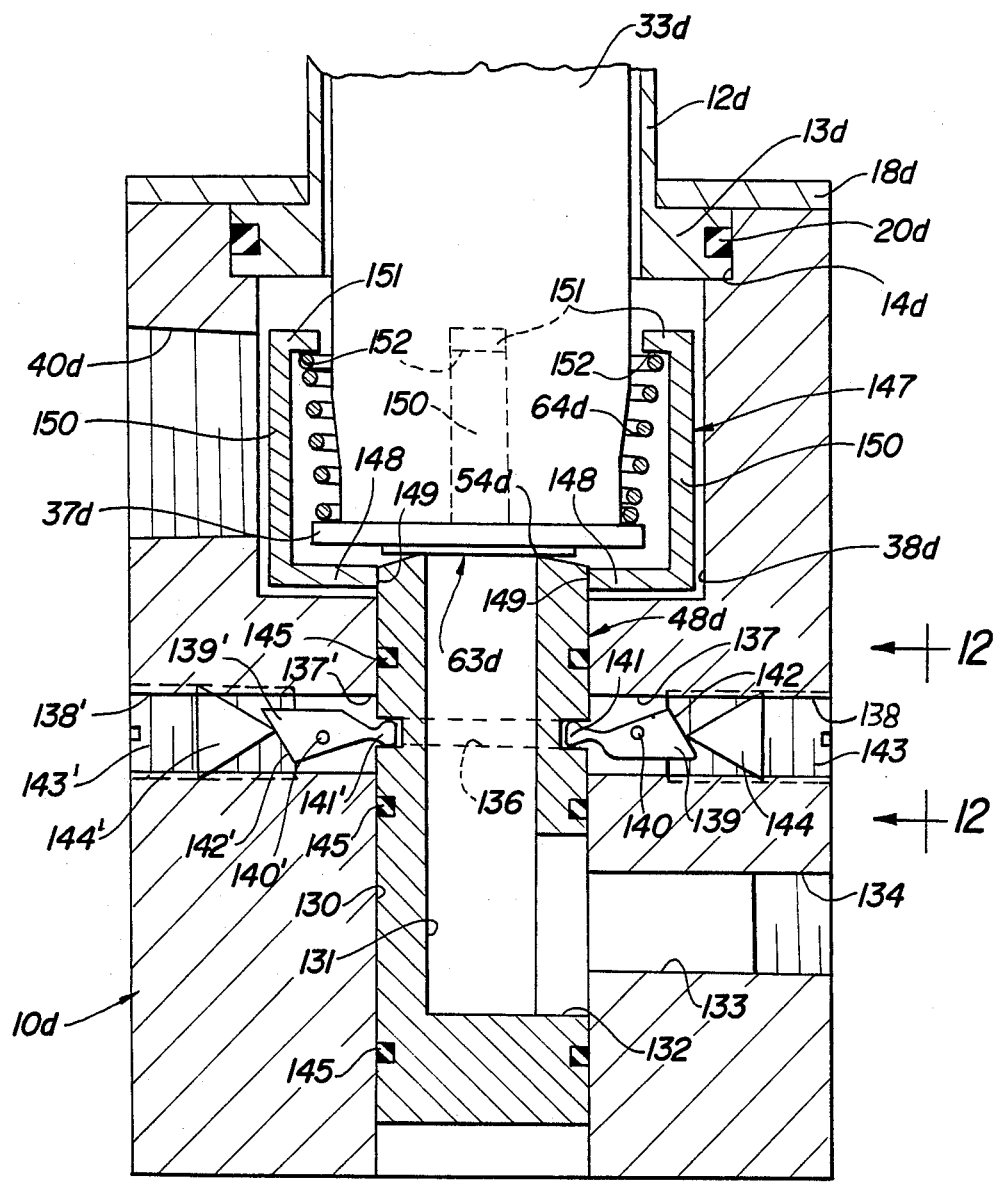
FIG. 11 is a fragmentary, longitudinal section view of a fifth embodiment of a solenoid wattage adjustment means adapted for use with a valve similar to the valve illustrated in FIG. 1, but with a slight structural change.

Referring now to the drawings, and in particular to FIG. 1, the numeral 10 generally designates a two-way valve body made in accordance with the invention. The numeral 11 generally designates a solenoid operatively mounted on the valve body 10. The solenoid 11 includes a cylindrical solenoid armature guide tube 12 which has a radially enlarged, integral lower end flange 13 that is seated in a recess 14 which is formed in the upper end 15 of the valve body 10. A clamp ring 18 is seated on the valve body end 15 and holds the armature guide tube 12 on the valve body 10. The clamp ring 18 is releasably secured to the valve body 10 by a plurality of suitable screws 19. An O-ring seal 20 is mounted in a groove formed around the armature guide tube lower end flange 13.

A cylindrical pole piece 21 has its lower end 23 integrally attached to the upper end of the armature guide tube 12 and it encloses the upper end of the armature guide tube 12. The upper end 22 of the pole piece 21 is externally threaded. The solenoid 11 includes a conventional solenoid coil 25 which is disposed around the solenoid armature cylindrical guide tube 12 and the pole piece 21. The lower end of the solenoid coil 25 is seated on the clamp ring 18. A conventional solenoid housing 26 surrounds the solenoid coil 25, with the lower end thereof being seated on the clamp ring 18. A flux ring 27 is mounted around the threaded upper end 22 of the pole piece 21, and it is seated against the upper end of the solenoid coil and solenoid housing 25 and 26, respectively. A suitable lock nut 28 is threadably mounted on the threaded upper end 22 of the pole piece 21 and it functions to retain the solenoid coil 25 and solenoid housing 26 in palce on the clamp ring 18. The numerals 29 and 30 in FIG. 1 designate the usual electrical power lead wires for the solenoid coil 25.

A solenoid armature or plunger 33 is slidably mounted within the cylindrical bore or chamber 34 in the armature guide tube 12. The distance that the upper end 35 of the armature 33 is spaced apart from the lower end 23 of the pole piece 21 is the stroke through which the armature 33 moves when the solenoid coil 25 is energized.

As shown in FIG. 1, the lower end of the armature 33 has a reduced diameter periphery 36, which terminates in an integral, enlarged diameter, peripheral flange 37. The lower end 36 and the flange 37 of the armature 33 extend downwardly into an axial, cylindrical transfer recess or chamber 38, which is formed in the upper end of the valve body 10 and which communicates at its upper end with the recess 14. A threaded cylinder or transfer port 40 is formed in one side of the valve body 10 and it communicates at its inner end with the transfer chamber 38. The transfer chamber 38 has a transverse inner end wall 41. A threaded inlet port 42 is formed in the bottom end of the valve body 10 and it communicates with the transfer chamber 38 through an axial, stepped diameter bore, which includes an upper threaded portion 43 and a lower, larger diameter, smooth bore portion 44.

A poppet valve seat member, generally indicated by the numeral 48, is adjustably mounted in the axial bore portions 43 and 44, in axial alignment with the armature 33. As shown in FIG. 1, the upper peripheral portion of the poppet valve seat member 48 is threaded, for threaded engagement with the threaded bore portion 43. The lower end of the poppet valve seat member 48 is provided with an integral, peripheral, enlarged diameter flange 50 which is slidably mounted in the smooth bore portion 44. A suitable O-ring seal 51 is operatively mounted in a groove formed on the outer periphery of the flange 50, for sliding and sealing engagement with the smooth bore portion 44. The poppet valve seat member 48 is provided with an axial bore 52, which extends inwardly from the upper end thereof, and which communicates with the transfer chamber 38 at its upper end. The lower end of the bore 52 communicates with a passage 53 which has an internal shape adapted to receive an Allen wrench, and which is formed in the lower end of the poppet valve seat member 48 which communicates with the inlet port 42. A circular poppet valve seat 54 is formed on the upper end of the cylindrical poppet valve seat member 48, around the upper end of the axial bore 52.

As shown in FIG. 1, the lower end of the solenoid armature 33 has an inwardly extended axial bore 58 which communicates with an enlarged diameter bore 59. The bore 59 communicates with a reduced diameter axial bore 60. The bore 60 is vented to the armature chamber 34 through a transverse vent passage 61. A poppet valve seal, generally indicated by the numeral 62, having a T-shaped vertical cross section body, as shown in FIG. 1, is seated in the armature bores 58 and 59, with the enlarged T-head portion seated in the bore 59 and on the shoulder formed by the junction of the bores 58 and 59. A suitable coil spring 63 is mounted in the armature bores 59 and 60, and functions as a poppet valve seal load spring. the load spring 63 is disposed with the lower end thereof in seating engagement against the inner side of the poppet valve seal 62, and the upper end thereof in seating engagement against the inner end wall of the bore 60. The poppet valve seal 62 is made from any suitable material, as for an example, an elastomeric material. An armature return spring 64 is mounted around the lower end of the armature 33 and the upper end thereof is seated against the lower end 13 of the armature guide tube end 12, and the lower end thereof is seated against the upper side of the armature flange 37. The armature return spring 64 functions to maintain the armature 33 in the position shown in FIG. 1, with the poppet valve seal 62 in seating engagement on the poppet valve seat 54 when the solenoid 11 is de-energized.

FIG. 1 shows the armature 33 in a position where it will be moved through a full stroke when the solenoid 11 is energized to open the valve and permit flow from the inlet port 42 and through the passage 53, the bore 52, and into the transfer chamber 38, and thence out through the supply port 40. The full stroke through which the armature 33 will move is equal to the distance or gap between the lower end 23 of the pole piece 21 and the upper end 35 of the armature 33. FIG. 3 shows the poppet valve seat member 48 adjusted axially upward, so that the stroke through which the armature 33 is moved when the solenoid coil 25 is energized, is reduced to about a ½ stroke, as compared to the stroke of the embodiment shown in FIG. 1.

As shown in FIG. 2, the adjustable poppet valve seat member 48 is provided with a pointer 68, or any other suitable indicia, to show the adjusted position of the adjustable poppet valve seat member 48, in proportion to the wattage required for moving the armature 33 through the gap or stroke determined by the position of the adjustable poppet valve seat member 48. As shown in FIG. 2, the number of watts required for moving the armature 33, through a gap to which the adjustable poppet valve seat member 48 has been adjusted, is indicated by indicia on the lower end of the valve body 10, so as to indicate the wattage required at each adjusted gap. Each valve would be calibrated in accordance with the parameters of all of the parts of each solenoid operated valve. The thread selected for the threaded peripheral surface 49 of the adjustable poppet valve seat member 48 and for the bore 43 would be such that one complete revolution in the clockwise direction, as viewed in FIG. 2, would move the adjustable poppet valve seat member 48 from a maximum gap position through the entire available armature gap or stroke to a zero gap position.

It will be seen, that the wattage required for operating the armature 33 can be quickly and easily adjusted, and that the same valve can be used for various wattage requirements with the only change needed being the changing of the solenoid coil 25 to a solenoid coil of the desired wattage, as for example, a low wattage or a high wattage coil. An advantage of the structure of the present invention is that is is not necessary to make the lengths of each of the solenoid elements, such as the armature and the position of a fixed valve seat to precise measurements to provide a valve which requires a predetermined wattage, since the gap or stroke of the armature 33 can be quickly and easily adjusted to provide a solenoid operated valve which will provide a low or a high wattage, as desired.

Figure 13:
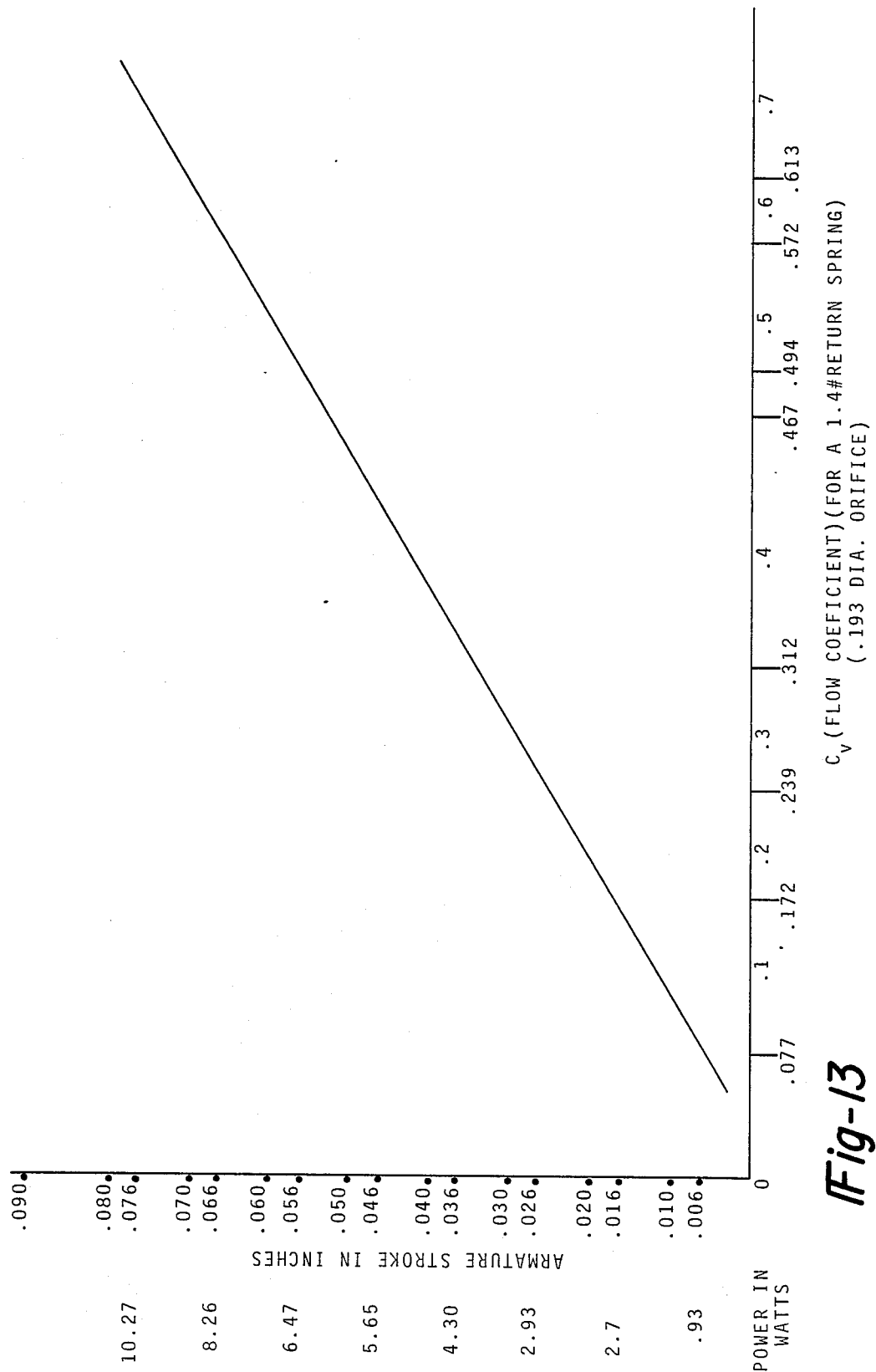
FIG. 13 is a graph illustrating the characteristics of the invention.

The graph of FIG. 13 illustrates the advantage of a solenoid operated valve with an adjustable poppet valve seat member as described hereinbefore. The values for the parameters employed in making the graph of FIG. 13 were obtained by running a test on a valve as decribed hereinbefore, wherein the poppet valve seat 54 had a 0.193 inch diameter orifice and the armature return spring 64 was a 1.4 pound return spring. The power to move the solenoid armature 33 through various length armature strokes in inches is plotted on the vertical axis and the flow coefficient $C_v$ is as plotted on the horizontal axis. The flow coefficient $C_v$ is determined by the uniform method promulgated by the National Fluid Power Association.

The graph of FIG. 13 functions to show a user what $C_v$ flow coefficient would be obtained for a predetermined armature stroke in inches and the power required in watts.

FIG. 4 is a fragmentary, longitudinal section of a second embodiment of a solenoid wattage adjustment means made in accordance with the invention and the parts of this second embodiment which are the same as the parts of the first embodiment of FIGS. 1-3 are marked with the same reference numerals follows by the small letter "a". The adjustable poppet valve seat member 48a is shown to be slidably mounted in an axial bore 70 formed in the upper end of the two-way valve body 10a. The bore 70 communicates at its upper end with the transfer chamber 38a which in turn communicates with a transfer port 40a in the same manner as in the embodiment of FIGS. 1-3. A suitable O-ring seal 71 is operatively mounted in a groove formed in the outer periphery of the poppet valve seat member 48a for sealing engagement with the bore 70. An axial bore 72 is formed through the adjustable poppet valve seat member 48a. The lower outer periphery of the adjustable poppet valve seat member 48a is threaded, as indicated by the numeral 73, and it is threadably received in the threaded inner periphery 74 of a rotatable, cylindrical, adjusting tube 75. The upper end of the cylindrcial tube 75 is rotatbly mounted in an enlarged diameter bore 76 which communicates with the bore 70. The upper end of the cylindrical tube 75 seats against the shoulder 77 formed at the junction point of the bores 70 and 76. A suitable O-ring 78 is operatively mounted in a groove formed around the upper end periphery of the cylindrical tube 75, and it sealingly engages the bore 76.

The lower end of the bore 76 communicates with a larger diameter bore 82 which opens to the exterior of the valve body 10a at the lower end thereof. A shoulder 83 is formed at the junction point between the bores 76 and 82. Integrally formed around the outer periphery of the cylindrical adjusting tube 75 is a thumb adjust wheel 84 which extends radially outward from the tube 75, at right angles, and seats against the shoulder 83 between the bores 76 and 82. As shown in FIG. 4, the thumb adjust wheel 84 extends sidewardly outward into a suitable recess 85 which is formed in the right side of the valve body 10a to provide access to the thumb adjust wheel 84 for rotating the same. As shown in FIGS. 4 and 5 a key 79 is fixedly mounted, as by a press fit, in a longitudinal groove 80 formed in the otuer periphery of the poppet valve seat member 48a, adjacent the upper end thereof. The key 79 is slidably mounted in a longitudinal groove 81 that is formed in the valve body 10a adjacent the upper end of the bore 70, and which communicates with the bore 70. It will be seen that the cylindrical adjusting tube 75 and the thumb adjust wheel 84 function together as a thumb screw adjusting means for axially adjusting the position of the poppet valve seat member 48a upwardly or downwardly. The key 79 prevents the poppet valve seat member 48a from rotating while permitting it to valve seat member 48a from rotating while permitting it to be moved axially when the cylindrical adjusting tube 75 is rotated.

The bore 82 in the lower end of the valve body 10a is enclosed by an inverted, T-shaped end cap 86 which has a tansverse, outwardly extended flange 87 integrally formed on the lower end thereof for seating engagement on the bottom end 88 of the valve body 10a. The end cap 86 is secured in place on the valve body 10a by a plurality of suitable screws 89. The inner end 92 of the end cap 86 seats against the lower side of the thumb adjust wheel 84. A circular groove 93 is formed in the upper end 92 of the end cap 86 and forms a seat for the lower end of the rotatable cylindrical adjusting tube 75. A suitable O-ring seal 94 is operatively seated in a groove formed around the lower end periphery of the cylindrical adjusting tube 75 for sealing engagement with the outer wall surface of the groove 93. An axial bore 95 is formed through the end cap 86 and functions as an inlet port. The inner end of the inlet port 95 communicates with a passge 96 through the rotatable cylindrical adjusting tube 75, which in turn communicates with the bore 72 formed through the adjustable poppet valve seat member 48a, which in turn communicates with the transfer chamber 38a.

.The numeral 98 designates a transverse, smooth face bore formed in the side of the valve body 10a. A transverse threaded bore 99 communicates the inner end of the bore 98 with the axial bore 70. A suitable lock screw 100 has the threaded stem thereof threadably mounted in the threaded bore 99, and the head thereof is rotatably mounted in the bore 98. The lock screw 100 is provided for locking the poppet valve seat member 48a in a desired adjusted position.

In use, the adjustable poppet valve seat member 48a may be adjusted upwardly and downwardly in the bore 70, to adjust the operating stroke of the armature 33a, by means of the thumb adjust wheel 84. The armature stroke adjusting means illustrated in FIG. 4 can be calibrated and provided with calibration indicia, as shown in FIG. 6. In FIG. 6, a stationary pointer 68a is formed on the valve body 10a, inside of the recess 85, and it is positioned to function with the wattage indicia markings on the periphery of the thumb adjust wheel 84.

FIG. 7 is a fragmentary, longitudinal section view of a third embodiment of a solenoid wattage adjustment means adapted for use with the valve structure illustrated in FIG. 1, and similar valve structures. The parts of the embodiment of FIG. 7 which are the same as the parts of the first embodiment of FIGS. 1 through 3 have been marked with the same reference numerals followed by the small letter "b".

In the embodiment of FIG. 7 the adjustable poppet valve seat member 48b is movably mounted in an axial bore 101 that extends downwardly from the transfer chamber 38b. An axial bore or flow passage 102 is formed in the adjustable poppet valve seat member 48b and it extends downwardly from the upper end thereof to an integral transverse wall 97. A transverse, longitudinally extended opening 103 is formed through the right side wall of the tubular adjustable poppet valve seat member 48b, as viewed in FIG. 7, and it communicates with a transverse, inlet flow passage 104, which in turn communicates with an inlet port 105. A pair of suitable O-ring seals 106 are operatively mounted in annular grooves formed around the periphery of the adjustable poppet valve seat member 48b and they are disposed on opposite longitudinal sides of the opening 103. The lower end of the axial bore 101 communicates with an enlarged diameter, threaded bore 107 which extends axially and downwardly to the exterior of the valve body 10b. The lower end of the adjustable poppet valve seat member 48b is provided with an integral outwardly extended, threaded radial flange 108 which is threadably mounted in the threaded bore 107. The lower end of the adjustable poppet valve seat member 48b has formed therein an allen wrench socket 109 for the reception of an allen wrench, for rotating the adjustable poppet valve seat member 48b to a desired adjusted position, to adjust the stroke of the armature 33b. A locking disc 110 is threadably mounted in the lower end of the threaded bore 107 and it is rotated into a locking engagement with the lower end of the adjustable poppet valve seat member 48b, after it has been adjusted to provide a desired stroke of the armature 33b.

FIG. 8 is a fragmentary, bottom view of the valve structure shown in FIG. 7, taken along the line 8—8 thereof, looking in the direction of the arrows, and with the locking disc 110 removed. As shown in FIG. 8, the lower end of the adjustable poppet valve seat member 48b is provided with an indicator arrow 112 for indicating the adjusted position of the poppet valve seat member 48b, in accordance with the calibrated wattage figures mounted around the lower end of said poppet valve seat member 48b. The wattage designations are on the bottom end of the valve body 10b. A user of the valve 10b would adjust the poppet valve seat member 48b to a desired wattage position for a desired stroke of the armature 33b, and then install the locking disc 110 so as to hold the poppet valve seat member 48b in the adjusted position. As shown, the adjustable poppet valve seat member 48b is positioned to provide the longest stroke of the armature 33b, which would require the greatest wattage. As the adjustable poppet valve seat member 48b is rotated in a clockwise direction, as viewed in FIG. 8, the stroke of the armature 33b is shortened and the required wattage to move the armature 33b is reduced.

FIG. 9 is a fragmentary, longitudinal section view of a fourth embodiment of a solenoid wattage adjustment means adapted for use with the valve illustrated in FIG. 1, and in other similar solenoid operated poppet valves. The parts of the embodiment of FIG. 9 which are the same as the parts of the first embodiment of FIGS. 1 through 3 have been marked with the same reference numerals followed by the small letter "c". In the embodiment of FIG. 9 an inlet port 113 is formed in the bottom end of the valve body 10c and it is axially aligned with, and communicates at its inner end with an axial bore 114, which in turn communicates at its upper end with the transfer chamber 38c. A suitable O-ring seal 115 is operatively mounted in a peripheral groove formed around the periphery of the poppet valve seat member 48c which is circular in cross section. An axial bore or passage 116 is formed through the poppet valve seat member 48c, and it communicates at the upper end thereof with the transfer chamber 38c and at the lower end thereof with the inlet port 113. The poppet valve seat member 48c is shown in FIG. 9 in its fully extended position. The poppet valve seat member 48c may be adjusted downwardly from the position shown in FIG. 9 to provide various lengths of stroke for the armature 33c, by the following described structure.

As shown in FIG. 9, the poppet valve seat member 48c is provided with a longitudinally extended, annular groove 117 which is formed around the outer periphery thereof. The lower end wall 118 of the annular groove 117 is formed at a downwardly extended and outwardly directed angle of approximately 45 degrees. The annular groove lower end wall 118 is adapted to be engaged by the pointed or conical end or nose of an adjusting screw 120 which is threadably mounted in a threaded bore 121 that is formed in the right side of the valve body 10c, as viewed in FIG. 9, and which communicates at its inner end with the bore 114. The outer end of the threaded bore 121 communicates with an enlarged diameter, smooth-faced bore 122 in which is slidably mounted an integral adjusting screw head 123. A suitable O-ring seal 124 is operatively mounted in an annular groove formed around the outer periphery of the screw head 123.

FIG. 10 is a fragmentary, right side view of the valve structure shown in FIG. 9, taken along the line 10—10 thereof, and looking in the direction of the arrows. FIG. 10 shows the indicia employed for indicating the adjusted position of the poppet valve seat member 48c for various wattage settings. The numeral 125 designates an arrow indicator formed on the outer face of the adjusting screw head 123. It will be seen that when the adjusting screw 120 is screwed outwardly or backed outwardly, the inlet pressure will act against the lower end 126 of the poppet valve seat member 48c so as to move it upwardly to adjust the stroke of the armature 33c. The upward movement of the poppet valve seat member 48c will be determined by the position of the conical inner end 119 of the screw 120 relative to the tapered lower end 118 of the annula groove 117 on the poppet valve seat member 48c. The last described valve elements would be calibrated so that the adjusted position of the screw 120 would determine how far the inlet pressure would move the poppet valve seat member 48c upwardly to shorten the stroke of the armature 33c. When it would be desired to increase the length of the stroke of the armature 33c, the adjusting screw 120 would be rotated clockwise, as viewed in in FIG. 10, so as to move it inwardly so that the conical inner end of the screw 120 would cause a cam pressure downwardly on the tapered lower end 118 of the annular groove 117, and move the poppet valve seat member 48c to a desired adjusted position to provide a desired length of stroke for the armature 33c in accordance with the desired wattage indicia as shown on the outer side of the valve body 10c. As shown in FIG. 9, the adjustable poppet valve seat member 48c is positioned at the zero stroke of the armature 33c. The pressure of the armature return spring 64c also assists in moving the poppet valve seat member 48c downwardly.

FIG. 11 is a fragmentary, longitudinal section view of a fifth embodiment of a solenoid wattage adjustment means adapted for use with a valve similar to the valve illustrated in FIG. 1. The parts of the embodiment of FIG. 11 which are the same as the parts of the first valve embodiment of FIGS. 1 through 3 have been marked with the same reference numerals followed by the small letter "d". In the embodiment of FIG. 11, the adjustable poppet valve seat member 48d is adjustably mounted in an axial bore 130 which extends through the valve body 10d and communicates at the upper end thereof with the transfer chamber 38d and at the lower end thereof to the exterior of the valve body 10d. The adjustable poppet valve seat member 48d is axially aligned with the armature 33d with which it is adapted to cooperate. The adjustable poppet valve seat member 48d is provided with an axial bore or passage 131 which is open at the upper end thereof and communicates at that point with the transfer chamber 38d. The lower end of the passage 131 is enclosed. A longitudinally extended opening 132 is formed through the side wall of the adjustable poppet valve seat member 48d and communicates the passage 131 with a transverse inlet passage 133 which extends sidewardly outward of the valve body 10d and communicates at its outer end with an inlet port 134.

The adjustable poppet valve seat member 48d is circular in cross section and it is provided around the outer periphery thereof with an inwardly extended groove 136. The valve body 10d is provided with a transverse bore 137 which communicates at the inner end thereof with the bore 130 in the valve body 10d, and at the outer end thereof with an aligned threaded bore 138 that teminates at its outer end to the exterior of the valve body 10d. A cam 139 is pivotally mounted on a pivot shaft 140 which is positioned at an off-center point of the body of the cam 139. The body of the cam 139 is circular in cross section and extends transversely inward, toward the poppet valve seat member 48d, and it has a rounded inner end 141 which is substantially ball-shaped and which is seated in the annular groove 136. As shown in FIG. 11, the outer flat end 142 of the cam 139 is formed at an angle which diverges downwardly and outwardly relative to the longitudinal axis of the valve body 10d. A cam adjust screw 143 is rotatably mounted in the outer end of the threaded bore 138 and it is provided with an integral pointed or conical end 144 which is slidably engagable with the angled outer end cam surface 142 on the cam 139. A second cam adjust screw and cam structure is operatively mounted in the valve body 10d in a position in alignment with the last described cam adjust screw and cam structure, and the corresponding parts have been marked with the same reference numerals followed by a prime mark. The two cam adjust screw and cam structures described hereinabove are identical in construction and oepration, with the exception that the angled outer end cam surface 142' is angled downwardly and inwardly in a converging direction as compared to the angled outer end cam surface 142 which is angled downwardly and outwardly and diverges outwardly. As shown in FIG. 11, the adjustable poppet valve seat member 48d is provided with a plurality of suitable O-ring seals 145 which are operatively mounted in peripheral grooves formed around the outer periphery of the adjustable poppet valve seat member 48d.

In the embodiments of FIGS. 1 through 10 the armature return spring 64d is subject to a pressure change when the adjustable poppet valve seat member 48d is adjusted. That is, when the poppet valve seat member 48d is adjusted upwardly so as to decrease the stroke of the armature 33d, the armature return spring 64d is compressed, which increases the pressure on the armature 33d and in turn on the poppet valve seat 54d. the embodiment of FIG. 11 however, is constructed and arranged so as to keep the pressure of the armature return spring 64d in a neutral condition.

An armature return spring carrier, generally indicated by the numeral 147, is provided to maintain the armature return spring 64d in a neutral condition. The armature return spring carrier 147 includes a plurality of substantially C-shaped spring retainer arms operatively attached to the upper end of the adjustable poppet valve seat member 48d. Each of the spring retainer arms includes a lower transverse or horizontal portion 148 which has its inner end 149 fixedly secured to the upper end outer periphery of the adjustable poppet valve seat member 48d by any switch means, as by welding, molding, or the like. The outer end of each of the lower horizontal retainer arm portions 148 is integrally attached to the lower end of a vertical retainer arm portion 150. The upper end of each of the vertical retainer arm portions 150 is integrally connected to the outer end of a short, inwardly extended transverse or horizontal prong or lip portion 151. The total number of spring retainer arms employed is preferably at least four arms which are evenly spaced around the upper end of the adjustable poppet valve seat member 48d.

As shown in FIG. 11, the armature return spring 64d has the upper end thereof seated against the under side surfaces 152 of the spring retainer arm prongs 151 and the lower end thereof seated against the upper side of the armature peripheral flange 37d. It will be seen that when the adjustable poppet valve seat member 48d is moved upwardly or downwardly in the bore 130, the armature return spring 64d will be carried along with the adjustable poppet valve seat member 48d and with the armature 33d, so that the relationship between the armature 33d and the armature return spring 64d is maintained constant or in a neutral condition.

It will be seen that in the embodiment of FIG. 11, the adjustable poppet valve seat member 48d may be moved upwardly and downwardly by moving simultaneously the two adjust screws 143 and 143' in opposite directions. For example, in order to move the adjustable poppet valve seat member 48d upwardly from the position shown in FIG. 11, to shorten the stroke of the armature 33d and lower the required wattage, the adjust screw 143 would be rotated in a clockwise direction, as viewed from the right side of Figure 11, to pivot the cam 139 in a clockwise direction, as viewed in FIG. 11, to move the adjustable poppet valve seat member 48d upwardly. Simultaneously, the other adjust screw 143' would be rotated in a counterclockwise direction, as viewed from the left side of FIG. 11, which would pivot the cam 139' in a counterclockwise direction, as viewed in FIG. 11. The two adjust screws 143 and 143' would be reversed in their directions, as compared to the aforedescribed rotations, for lowering the poppet valve seat member 48d.

Figure 12:
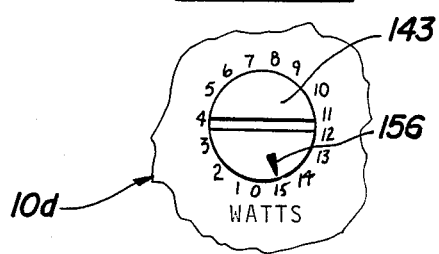
FIG. 12 is a fragmentary, right side view of the valve structure shown in FIG. 11, taken along the line 12—12 thereof, and looking in the direction of the arrows.

FIG. 12 is a fragmentary, right side elevation view of the valve structure shown in FIG. 11, and showing the adjust screw 143 provided with an indicator arrow 156 for indicating the rotative adjusted position of the adjust screw 143, to indicate the wattage which would be required to move the armature 33d at the various adjusted positions of the adjust screw 143. The calibration procedure for determining the different wattage settings is carried out so as to coordinate the threads of the screw 143 and threads in the threaded bore 138 for the adjust screw 143 and the longitudinal movement of the adjustable poppet valve seat member 48d.

The solenoid operated poppet valve illustrated in FIG. 1 is a two-way poppet valve, but it will be understood that the solenoid wattage adjustment means of the invention can be employed in other poppet valves, such as a three-way valve, or a four-way valve.

A desired adjustment of a poppet valve seat member 48 in the aforedescribed valve embodiments may be made in the manufacturer's plant before shipping out a new valve, or the adjustment may be made in the field by a user of a valve. The various parts of the valves illustrated herein may be made from any suitable material.

What is claimed is:

1. A solenoid operated valve having a valve body on which is mounted a solenoid coil with an armature operatively mounted in said coil for axial movement through a predetermined stroke, said valve having a plurality of fluid ports which includes at least one fluid supply port and one pressure fluid inlet port, and a plurality of fluid passages connecting said ports, the flow of pressure fluid from the inlet port through said passages to the supply port being controlled by a poppet valve including a poppet seal carried by said armature and a poppet valve seat in said valve body in communication with said inlet port, said poppet seal on said armature being maintained in seating engagement on said poppet valve seat by an armature return spring, which exerts a closing pressure greater than the pressure of the pressure fluid, when the solenoid coil is deenergized to close off flow of pressure fluid through the poppet valve seat, and when the solenoid is energized the armature is moved through a working stroke to retract the poppet valve seal from the poppet valve seat and allow pressure fluid to flow through the poppet valve seat, characterized in that:
    (a) the poppet valve seat is carried on one end of an adjustable poppet valve seat member in the valve body, and said poppet valve seat member is adjustable axially of the armature working stroke, to adjust the length of the armature working stroke, to correspondingly adjust the solenoid wattage required to overcome the closing pressure of the armature return spring, to move the armature through its working stroke when the solenoid is energized; and,
    (b) means for axially adjusting the poppet valve seat member.

2. A solenoid operated valve as defined in claim 1, characterized in that:
    (a) an armature return spring carrier is fixedly mounted on the poppet valve seat member, in a position about the poppet valve seat; and,
    (b) the armature return spring is mounted under compression with said spring carrier, with one end seated on the spring carrier and the other end seated on the armature, whereby when the poppet valve seat member is adjusted, the compression of the armature return spring is not changed.

3. A solenoid operated valve as defined in claim 1, characterized in that:
    (a) said means for axially adjusting the poppet valve seat member in the valve body comprises a threaded means.

4. A solenoid operated valve as defined in claim 3, characterized in that:
    (a) said valve pressure fluid inlet port is formed in the lower end of the valve body and it communicates with fluid passages through the poppet valve seat member and through the poppet valve seat.

5. A solenoid operated valve having a valve body on which is mounted a solenoid coil with an armature operatively mounted in said coil for axial movement through a predetermined stroke, said valve having a plurality of fluid ports, and a plurality of fluid passages connecting said ports, the flow of fluid through said passages being controlled by a poppet valve including a poppet seal carried by said armature and a poppet valve seat in said valve body, said poppet seal on said armature being maintained in seating engagement on said poppet valve seat by an armature return spring when the solenoid coil is de-energized to close off flow of fluid through the poppet valve seat, and when the solenoid is energized the armature is moved through a working stroke to retract the poppet valve seal from the poppet valve seat and allow fluid to flow through the poppet valve seat, charcterized in that:
    (a) the poppet valve seat is carried on one end of an adjustable poppet valve seat member in the valve body, and said poppet valve seat member is adjustable axially of the armature working stroke, to adjust the length of the armature working stroke, to correspondingly adjust the solenoid wattage required to move the armature through its working stroke when the solenoid is energized;
    (b) means for axially adjusting the poppet valve seat member;
    (c) said means for axially adjusting the poppet valve seat member in the valve body comprises a threaded means;
    (d) said valve is provided with an inlet port in the lower end of the valve body that communicates with fluid passages through the poppet valve seat member and through the poppet valve seat;
    (e) the threaded means for axially adjusting the poppet valve seat member in the valve body comprises a threaded bore in the valve body and a mating threaded periphery on a cylindrical outer periphery of the poppet valve seat member; and,
    (f) a wrench socket is formed in the fluid passage through the poppet valve seat member for the reception of a wrench to adjust the poppet valve seat member.

6. A solenoid operated valve as defined in claim 5, characterized in that:
(a) the poppet valve seat member is provided on the other end thereof with an indicator means that is calibrated through the rotative positions thereof, when the poppet valve seat member is rotatively adjusted, to correspond to wattage indicia marked on the bottom of the valve body around the inlet port.

7. A solenoid operated valve as defined in claim 4, characterized in that:
(a) the threaded means for axially adjusting the poppet valve seat member in the valve body comprises an internally threaded tube into which the poppet valve seat member is threadably mounted, and the tube is restrained against axial movement, whereby when the tube is rotated, the poppet valve seat member is axially moved in a direction corresponding to the direction of rotation of the tube; and,
(b) a thumb wheel is attached to the tube and extends through an opening in the side of the valve body, for manually rotating the tube.

8. A solenoid operated valve as defined in claim 7, characterized in that:
(a) the thumb wheel is provided on the periphery thereof with wattage indicia that is calibrated through the rotative positions of the thumb wheel, when the poppet valve seat member is rotatively adjusted, to correspond to an indicator means on the side of the valve body.

9. A solenoid operated valve as defined in claim 7, characterized in that:
(a) a lock screw is operatively mounted in the valve body for selective engagement with the poppet valve seat member to lock it in an adjusted position.

10. A solenoid operated valve as defined in claim 3, characterized in that:
(a) said valve pressure fluid inlet port is formed in the side of the valve body and it communicates with fluid passages through the poppet valve seat member and through the poppet valve seat.

11. A solenoid operated valve as defined in claim 10, characterized in that:
(a) the threaded means for axially adjusting the poppet valve seat member in the valve body comprises threaded bore in the valve body and a mating threaded periphery on a cylindrical outer periphery of the poppet valve seat member;
(b) a wrench socket is formed in the fluid passage through the poppet valve seat member for the reception of a wrench to ajust the position of the poppet valve seat member; and,
(c) said poppet valve seat member is locked in an adjusted position by a lock disc threadably mounted in the threaded bore in the valve body in which the poppet valve seat member is positioned.

12. A solenoid operated valve as defined in claim 11, characterized in that:
(a) the poppet valve seat member is provided on the other end thereof with an a indicator means that is calibrated poppet valve seat member is rotatively adjusted, to correspond to wattage indicia marked on the bottom of the valve body around the threaded bore in which the poppet valve seat member is positioned.

13. A solenoid operated valve as defined in claim 1, characterized in that:
(a) said poppet valve seat member is axially slidable in a bore in the valve body;
(b) said valve pressure fluid inlet port is formed in the lower end of the valve body and it communicates with a fluid passage through the poppet valve seat member and through the poppet seat; and,
(c) the poppet valve seat member is adjusted upwardly and downwardly in the valve body by the co-action of a pressure adjust screw and the fluid entering through the inlet port, which exerts a pressure against the lower end of the poppet valve seat member, said presure adjust screw being threadably mounted in the valve body in a position transverse to the longitudinal axis of the poppet valve seat member and having a conical end engagable with the poppet valve seat member.

14. A solenoid operated valve as defined in claim 13, characterized in that:
(a) the pressure adjust screw is provided on the outer end thereof with an indicator means that is calibrated through the rotative positions thereof, when the poppet valve seat member is rotatively adjusted, to correspond to wattage indicia marked on the side of the valve body around the pressure adjust screw.

15. A solenoid operated valve as defined in claim 1, characterized in that:
(a) said poppet valve seat member is axially slidable in a bore in the valve body;
(b) said valve pressure fluid inlet port is formed in the side of the valve body and it communicates with a fluid passage through the valve body, the poppet valve seat member and through the poppet seat; and,
(c) the poppet valve seat member is adjusted upwardly and downwardly in the valve body by a pair of cam members operated by a pair of cam adjust screws mounted in a pair of aligned transverse bores on opposite sides of the poppet valve seat member bore.

16. A solenoid operated valve as defined in claim 15, characterized in that:
(a) at least one of the cam adjust screws is provided on the outer end thereof with an indicator means that is calibrated through the rotative positions thereof, when the poppet valve seat member is rotatively adjusted, to correspond to wattage indicia marked on the side of the valve body around the cam adjust screw.

* * * * *

UNITED STATES PATENT AND TRADEMARK OFFICE
CERTIFICATE OF CORRECTION

PATENT NO. : 4,834,337
DATED : May 30, 1989
INVENTOR(S) : William J. Chorkey

It is certified that error appears in the above-identified patent and that said Letters Patent is hereby corrected as shown below:

In Column 14, line 3, after the word "calibrated" insert --through the rotative positions thereof, where the--;

Signed and Sealed this

Twenty-seventh Day of February, 1990

Attest:

JEFFREY M. SAMUELS

Attesting Officer     Acting Commissioner of Patents and Trademarks